US008560437B2

(12) United States Patent
Takeshita et al.

(10) Patent No.: US 8,560,437 B2
(45) Date of Patent: Oct. 15, 2013

(54) INFORMATION PROCESSING APPARATUS, INFORMATION PROCESSING METHOD, AND PROGRAM PRODUCT

(75) Inventors: Hiroki Takeshita, Tokyo (JP); Yoshimasa Sugimoto, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 293 days.

(21) Appl. No.: 13/046,218

(22) Filed: Mar. 11, 2011

(65) Prior Publication Data

US 2011/0225085 A1  Sep. 15, 2011

(30) Foreign Application Priority Data

Mar. 12, 2010  (JP) ................................. 2010-056005

(51) Int. Cl.
  *G06Q 40/00*  (2012.01)
(52) U.S. Cl.
  USPC .............................................. 705/38; 705/40
(58) Field of Classification Search
  None
  See application file for complete search history.

(56) References Cited

FOREIGN PATENT DOCUMENTS

JP    2002-007703 A    1/2002

OTHER PUBLICATIONS

Ieda Akira et al., "A Simplified Method for Calculating the Credit Risk of Lending Portfolios", Monetary and Economic Studies, 2009. 9, Institute of Monetary and Economic Studies, Bank of Japan.
Ando Yoshitaka et al., "An Analytical Evaluation Method for Credit Risk of Credit Portfolio Centered on Limiting Loss Distribution and Granularity Adjustment", Monetary and Economic Studies, 2005. 7, Institute of Monetary and Economic Studies, Bank of Japan.
Kikuchi Kentaro, "An Analytic Method for Evaluating Credit Portfolio VaR: Theory and Numerical Verification of Approximate Calculation by the Conditioned Saddle Point Method", Monetary and Economic Studies, vol. 26, separate vol. 2, Institute of Monetary and Economic Studies, Bank of Japan, 2007.
Higo Hideaki, "Basic and Application of Credit Risk Measuring Model", Center for Advanced Finance Bureau, Banking and Financial Mechanism, Bank of Japan, Jul. 10, 2006.

*Primary Examiner* — Charles Kyle
*Assistant Examiner* — Chia Yi Liu
(74) *Attorney, Agent, or Firm* — Arent Fox LLP

(57) ABSTRACT

Aspects of the invention relate to creating virtual data of an effective obligor number N based on setting information, determining ratings after transition of the virtual data for a plurality of scenarios according to rating transition data representing transition of each rating, calculating a risk amount for each of the scenarios based on the rating after transition of the virtual data and specifying a risk amount corresponding to a confidence level as a predicted risk amount of the virtual data, setting a minimum effective obligor number N among the effective obligor numbers N when predicted risk amounts smaller than an allowable risk amount are specified, as a diversification object number, and calculating a credit limit based on the set diversification object number and a total credit.

5 Claims, 17 Drawing Sheets

*FIG.5A*

RATING-CATEGORIZED PARAMETERS

| RATING | CALCULATION OBJECT | PD | CORRELATION |
|---|---|---|---|
| S | NO | 0.00% | 0.00% |
| A | YES | 0.03% | 1.00% |
| B | YES | 0.05% | 1.00% |
| C | YES | 0.10% | 2.00% |
| D | YES | 0.50% | 2.00% |
| E | YES | 1.00% | 3.00% |
| F | YES | 2.00% | 3.00% |
| G | NO | 4.00% | 4.00% |
| DEFAULT | NO | 100.00% | 4.00% |

FIG.5B

VARIOUS SETTING PARAMETERS IN
CALCULATING NUMERICAL VALUE

| NUMBER OF TRIALS OF RATING TRANSITION | 10,000 |
|---|---|
| N-SEARCH ZONE MINIMUM | 10 |
| N-SEARCH ZONE MAXIMUM | 1000 |

FIG.5C

FUNDAMENTAL PARAMETERS

| TOTAL CREDIT | 1,500,000,000,000 |
|---|---|
| ALLOWABLE RISK AMOUNT | 30,000,000,000 |
| CONFIDENCE LEVEL $\alpha$ AT RATING TRANSITION TIME | 99.0% |
| CONFIDENCE LEVEL $\beta$ WHEN CALCULATING RISK AMOUNT | 99.0% |
| LGD | 45% |

FIG.5D

RATING TRANSITION MATRIX

| PRESENT PERIOD | NEXT PERIOD | | | | | | | | | |
|---|---|---|---|---|---|---|---|---|---|---|
| | S | A | B | C | D | E | F | G | DEFAULT | TOTAL |
| S | 100.0% | 0.0% | 0.0% | 0.0% | 0.0% | 0.0% | 0.0% | 0.0% | 0.00% | 100% |
| A | 0.0% | 85.0% | 7.97% | 5.0% | 2.0% | 0.0% | 0.0% | 0.0% | 0.03% | 100% |
| B | 0.0% | 3.0% | 85.0% | 8.0% | 2.0% | 0.95% | 1.0% | 0.0% | 0.05% | 100% |
| C | 0.0% | 0.0% | 4.0% | 70.0% | 16.0% | 5.0% | 3.0% | 1.9% | 0.10% | 100% |
| D | 0.0% | 0.0% | 2.0% | 13.0% | 60.0% | 20.0% | 3.0% | 1.5% | 0.50% | 100% |
| E | 0.0% | 0.0% | 0.0% | 4.0% | 15.0% | 60.0% | 15.0% | 5.0% | 1.00% | 100% |
| F | 0.0% | 0.0% | 0.0% | 0.0% | 8.0% | 25.0% | 50.0% | 15.0% | 2.00% | 100% |
| G | 0.0% | 0.0% | 0.0% | 0.0% | 5.0% | 15.0% | 31.0% | 45.0% | 4.00% | 100% |
| DEFAULT | 0.0% | 0.0% | 0.0% | 0.0% | 0.0% | 0.0% | 0.0% | 0.0% | 100.00% | 100% |

FIG.5E

CALCULATION RESULT

| RATING | CREDIT LIMIT (THEORETICAL VALUE) | MINIMUM DIVERSIFIED COMPANY NUMBER $N_{min}$ |
|---|---:|---:|
| S | 0 | 0 |
| A | 20,270,270,270 | 74 |
| B | 20,000,000,000 | 75 |
| C | 19,480,519,481 | 77 |
| D | 17,647,058,824 | 85 |
| E | 13,761,467,890 | 109 |
| F | 8,771,929,825 | 171 |
| G | 0 | 0 |
| DEFAULT | 0 | 0 |

FIG.6

| OBLIGOR i | PRESENT RATING Ri | EADi |
|---|---|---|
| i=1 | C | 15,000,000,000 |
| 2 | C | 15,000,000,000 |
| 3 | C | 15,000,000,000 |
| 4 | C | 15,000,000,000 |
| 5 | C | 15,000,000,000 |
| ... | ... | ... |
| ... | ... | ... |
| ... | ... | ... |
| ... | ... | ... |
| ... | ... | ... |
| ... | ... | ... |
| N-2 | C | 15,000,000,000 |
| N-1 | C | 15,000,000,000 |
| N | C | 15,000,000,000 |

FIG.8

| OBLIGOR i | PRESENT RATING Ri | POST-TRANSITION RATING Rij | | | |
|---|---|---|---|---|---|
| | | RATING TRANSITION SCENARIO 1 | RATING TRANSITION SCENARIO 2 | ... | RATING TRANSITION SCENARIO 10000 |
| i=1 | C | D | C | ... | F |
| 2 | C | C | C | ... | C |
| 3 | C | C | B | ... | C |
| 4 | C | B | B | ... | B |
| 5 | C | D | C | ... | D |
| ... | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |
| N-2 | C | C | C | ... | E |
| N-1 | C | D | C | ... | C |
| N | C | D | D | ... | B |

FIG.9

RATING TRANSITION SCENARIO 1 (j = 1)

| OBLIGOR i | POST-TRANSITION RATING Rij | RISK AMOUNT CALCULATING PARAMETERS | | | |
|---|---|---|---|---|---|
| | | PDi | CORRELATION ri | LGDi | EADi |
| i=1 | D | 0.50% | 2.00% | 45% | 15,000,000,000 |
| 2 | C | 0.10% | 2.00% | 45% | 15,000,000,000 |
| 3 | C | 0.10% | 2.00% | 45% | 15,000,000,000 |
| 4 | B | 0.05% | 1.00% | 45% | 15,000,000,000 |
| 5 | D | 0.50% | 2.00% | 45% | 15,000,000,000 |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| N-2 | C | 0.10% | 2.00% | 45% | 15,000,000,000 |
| N-1 | D | 0.50% | 2.00% | 45% | 15,000,000,000 |
| N | D | 0.50% | 2.00% | 45% | 15,000,000,000 |

FIG.10

| RATING TRANSITION SCENARIO j | RISK AMOUNT Vj |
|---|---|
| j=1 | 13,500,000,000 |
| 2 | 27,000,000,000 |
| 3 | 6,750,000,000 |
| 4 | 40,500,000,000 |
| 5 | 20,250,000,000 |
| ... | ... |
| ... | ... |
| ... | ... |
| ... | ... |
| ... | ... |
| ... | ... |
| 9998 | 20,250,000,000 |
| 9999 | 27,000,000,000 |
| 10000 | 33,750,000,000 |

FIG.11

| EFFECTIVE OBLIGOR NUMBER N | WORST TIME RISK AMOUNT $W_\alpha$ |
|---|---|
| N=10 | 67,500,000,000 |
| 11 | 61,363,636,364 |
| 12 | 56,250,000,000 |
| ... | |
| ... | |
| ... | |
| 998 | 3,381,763,527 |
| 999 | 3,378,378,378 |
| 1000 | 3,375,000,000 |

INFORMATION PROCESSING APPARATUS, INFORMATION PROCESSING METHOD, AND PROGRAM PRODUCT

CROSS-REFERENCE TO RELATED APPLICATIONS

This application is based upon and claims the benefit of priority of the prior Japanese Patent Application No. 2010-056005, filed on Mar. 12, 2010, the entire contents of which are incorporated herein by reference.

BACKGROUND OF THE INVENTION

1. Field of the Invention

The present invention relates to an information processing apparatus, an information processing method, and a program product.

2. Description of the Related Art

Generally, when providing financing, a financial institution assigns a rating to a customer based on financial data such as a balance sheet, an income statement and so on of the customer and determines a financing amount based on the credit limit corresponding to the rating which was previously determined in the financial institution.

For example, Japanese Laid-open Patent Publication No. 2002-7703 (alternatively referred to herein as Patent Document 1), the entirety of which is incorporated by reference herein, discloses a financial transaction system configured such that the credit line (credit limit) according to an in-house score (rating previously determined for the company) is set in advance for each enterprise scale of a business partner obtained from information such as sales, total assets, equity capital and so on available from research agencies so that once the in-house score and the enterprise scale are determined, the credit line is automatically set.

In the technology discussed in Patent Document 1, a method based on the expected loss (EL) is adopted to derive the upper limit of the credit line on the assumption that "if the actual number of failures is the same as the predicted number of failures," but a loss exceeding the expected loss is not taken into account. Further, the EL is an indicator having the same value in the case where 10 billion yen is loaned to one enterprise and in the case where 5 billion yen is loaned to each of two enterprises, without considering the actual number of obligors (effective obligor number) based on the bias of the balance. In short, the conventional technology does not appropriately take into account the risk amount in the calculation of the credit limit and thus has a problem of failing to appropriately set the credit limit.

SUMMARY OF THE INVENTION

The present invention is made in view of such problems, and an object thereof is to set a credit limit more appropriately.

In accordance with one aspect of the present invention, an information processing apparatus according to the present invention includes: a virtual data creating unit creating virtual data of an effective obligor number N based on setting information stored in a storage part; a post-transition rating determining unit determining ratings after transition of the virtual data for a plurality of scenarios according to rating transition data representing transition of each rating stored in the storage part; a predicted risk amount specifying unit calculating a risk amount for each of the scenarios based on the rating after transition of the virtual data and specifying a risk amount corresponding to a confidence level stored in the storage part as a predicted risk amount of the virtual data; a diversification object number setting unit setting a minimum effective obligor number N among the effective obligor numbers N when predicted risk amounts smaller than an allowable risk amount stored in the storage part are specified by the predicted risk amount specifying unit, as a diversification object number; and a credit limit calculating unit calculating a credit limit based on the diversification object number set by the diversification object number setting unit and a total credit stored in the storage part.

In some aspects of the present invention, the "virtual data creating unit" may correspond, for example, to the later-described virtual data creating unit 100. In other aspects, the "post-transition rating determining unit" may correspond, for example, to the later-described post-transition rating determining part 110. In yet other aspects, the "predicted risk amount specifying unit" may correspond, for example, to the later-described predicted risk amount specifying part 120. In further aspects, the "diversification object number setting unit" may correspond, for example, to the later-described diversification object number setting part 130. In yet further aspects, the "credit limit calculating unit" may correspond, for example, to the later-described credit limit calculating part 140.

In accordance with another aspect of the present invention, an information processing apparatus according to the present invention includes: a post-transition rating determining unit acquiring rating transition data representing transition of each rating from a storage part, and determining ratings after transition in a plurality of scenarios composed of an object number N using random numbers; a risk amount calculating unit acquiring a correlation and a probability of default corresponding to the rating after transition determined by the post-transition determining unit, a previously set loss given default, and a previously set total credit from the storage part, and calculating a risk amount for each of the scenarios based on the acquired correlation, probability of default, loss given default, and total credit; a predicted risk amount specifying unit specifying a risk amount corresponding to a confidence level stored in the storage part as a predicted risk amount of the object number N from the risk amount calculated by the risk amount calculating unit; a diversification object number setting unit setting a minimum object number N among the object numbers N when predicted risk amounts smaller than an allowable risk amount stored in the storage part are specified by the predicted risk amount specifying unit, as a diversification object number; and a credit limit calculating unit calculating a credit limit based on the diversification object number set by the diversification object number setting unit and the total credit.

In some aspects of the present invention, the "post-transition rating determining unit" may correspond, for example, to the later-described post-transition rating determining part 200. In other aspects, the "risk amount calculating unit" may correspond, for example, to the later-described risk amount calculating part 210. In yet other aspects, the "predicted risk amount specifying unit" may correspond, for example, to the later-described predicted risk amount specifying part 220. In further aspects, the "diversification object number setting unit" may correspond, for example, to the later-described diversification object number setting part 230. In yet further aspects, the "credit limit calculating unit" may correspond, for example, to the later-described credit limit calculating part 240.

BRIEF DESCRIPTION OF THE DRAWINGS

FIG. 5A is a chart illustrating examples of rating-categorized parameters;

FIG. 5B is a chart illustrating examples of various setting parameters;

FIG. 5C is a chart illustrating examples of fundamental parameters;

FIG. 5D is a chart illustrating an example of a rating transition matrix;

FIG. 5E is a chart illustrating an example of display of calculation result;

FIG. 6 is a chart illustrating an example of virtual portfolio data;

FIG. 8 is a chart illustrating an example of post-transition rating;

FIG. 9 is a chart illustrating examples of risk amount calculating parameters;

FIG. 10 is a chart illustrating an example of the risk amount;

FIG. 11 is a chart illustrating an example of the worst time risk amount; and

DETAILED DESCRIPTION

Figure 1A:
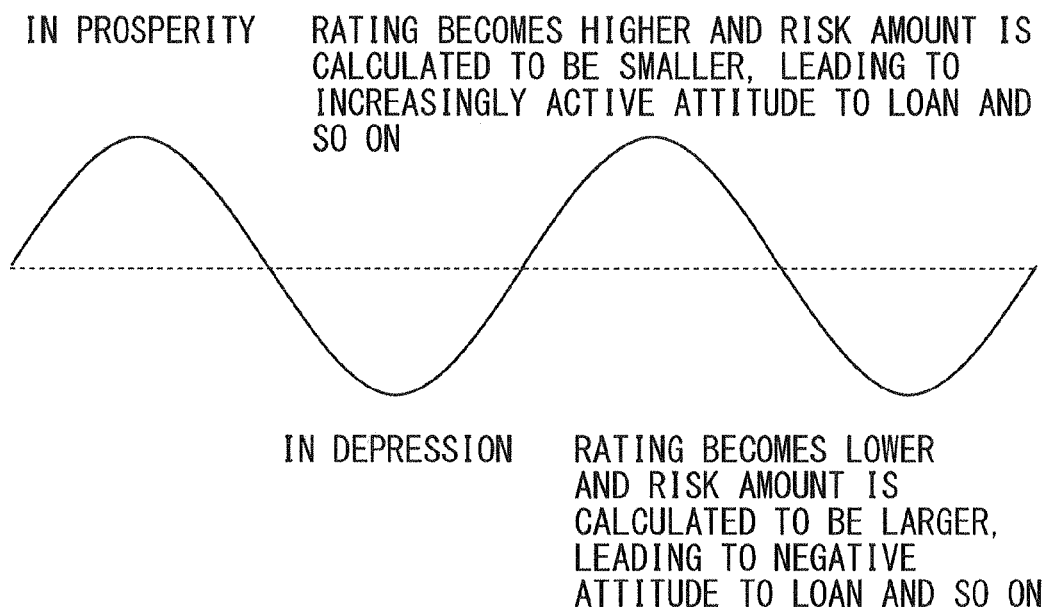
FIG. 1A is a graph illustrating an example of the relationship between the business condition and the rating.

Hereinafter, aspects of the present invention will be explained based on the drawings.

Initially, an aspect of the present invention relating to finding the credit limit in appropriate consideration of the risk amount will be explained.

The credit limit here is not the value found from the perspective of the financial repayment capacity of an obligor but the value found from the perspective of the allowable limit of credit concentration to one obligor as the credit portfolio management of a financial institution even when the financial institution judges to be able to provide financing for the obligor in terms of the financial status. Note that the one obligor is not merely the one obtained by computer-assisted name identification of the obligor such as a corporate status or the like but may also be the one constituted of obligors belonging to the same enterprise group or the like in terms of the credit risk that are gathered together to be regarded as one person (one company).

More specifically, as the degree of the credit concentration to few obligors even having high ratings is increased, the risk amount (the probabilistically incurred greatest loss which is calculated based on the fluctuation in economic value) that the financial institution bears increases.

Hence, in this aspect, the concentration to a specific obligor is limited by setting the credit limit at a fixed value to thereby quantitatively find the credit limit to keep the risk amount of the portfolio at a fixed value or less.

Note that the credit limit includes not only the hard limit to limit provision of financing or the like more than the amount but also the soft limit that is a criterion such as the alarm line adopting conditions of transaction, business operation or the like different from ordinary case.

Further, the credit limit is likened to stock investment as follows.

Investment of all assets in only one particular stock such as a stock of A company causes a great risk (in other words, there is a high probability of great loss). Hence, the risk can be reduced by diversified investment in a plurality of stocks using the portfolio logic, and the limit how much at most the investment amount per one stock should be is considered in order to keep the risk at a fixed value or less.

For example, when the stocks are listed on the first section of the Tokyo Stock Exchange, an indication of the number of stocks for diversified investment is sometimes suggested. However, viewed from a different angle, it is conceivable that "the limit=all assets/the minimum diversified stock number." It is found that when the investment amount per one stock is kept at the aforementioned limit or less, the number of stocks in the portfolio is equal to or more than the minimum diversified stock number as a result. In other words, even though the number of stocks is simply satisfied, the actual number of stocks is not increased if the stocks are biased to particular stocks, and therefore the investment is made based on the limit.

The indication of the number of stocks here is not always the one quantitatively found in some cases. However, a quantitative approach of the idea used here reaches the calculation of "the number of N which should be set at least when a risk indicator such as a VaR (Value-at-Risk) is desired to be kept at a fixed value or less in a concept of a virtual diversified investment almost evenly made in N stocks."

Further, when the same calculation is made on the stocks listed on the second section of the Tokyo Stock Exchange or the emerging equity market, the value of N may be larger than the value of N in the example above. In short, it is predicted that when the targets of investment are classified into categories with similar risk characteristics, calculation results will differ from one category to another.

Applying the likening of the stock investment to the credit limit in one aspect, the calculation of "the number of N which should be set at least when a risk indicator (the credit risk here though the market risk in the above example) such as a VaR·UL (unexpressed loss) is desired to be kept at a fixed value or less in a concept of a virtual credit evenly made to N obligors" needs to be made.

Assuming that N satisfying the condition is a minimum diversified company number ($N_{min}$), the credit limit=the total credit/$N_{min}$. It is found that when the EAD (credit amount) per obligor is set to the aforementioned credit limit or less, the actual number of obligors (effective obligor number) in the portfolio is equal to or more than $N_{min}$ as a result. In other words, even though the number of obligors is simply satisfied, the actual number of obligors is not increased if the credit is biased to particular obligors, and therefore the credit needs to be provided based on the credit limit. The EAD here is exposure at default.

Note that as the method of finding N when an uneven portfolio is approximated by an even portfolio of N, N can be calculated as N=1/the square of concentration coefficient (namely, the concentration coefficient=$1/\sqrt{N}$) using, for example, the concentration coefficient described in Ieda Akira, Marumo Kouhei and Yoshiba Toshinao, "A Simplified Method for Calculating the Credit Risk of Lending Portfolios," *Monetary and Economic Studies*, 2009. 9, Institute of Monetary and Economic Studies, Bank of Japan (alternatively referred to herein as reference document 1), the entirety of which is incorporated by reference herein. A similar calculation expression is used as the effective number of exposure in Notification No. 19, Article 261, Paragraph 1 and so on of Financial Service Agency, the entirety of which is incorporated by reference herein.

Further, when the obligors are classified into categories having similar risk characteristics, there can be basically ratings (inner ratings, outer ratings) of the obligors. However, the risk amounts based only on the present ratings have a problem of pro-cyclicality (the effect of amplifying the business cycle).

More specifically, as illustrated in FIG. 1A, the rating of an obligor fluctuates with the business condition, so that when such a risk indicator is used as the criterion of judgment to provide a loan or the like, the risk indicator can result in a great change of the loan attitude due to the business condition. Note that though a rating model of TTC (Through the Cycle) unlikely affected by the business condition is addressed, the rating actually changes at a certain percentage every year.

Figure 1B:
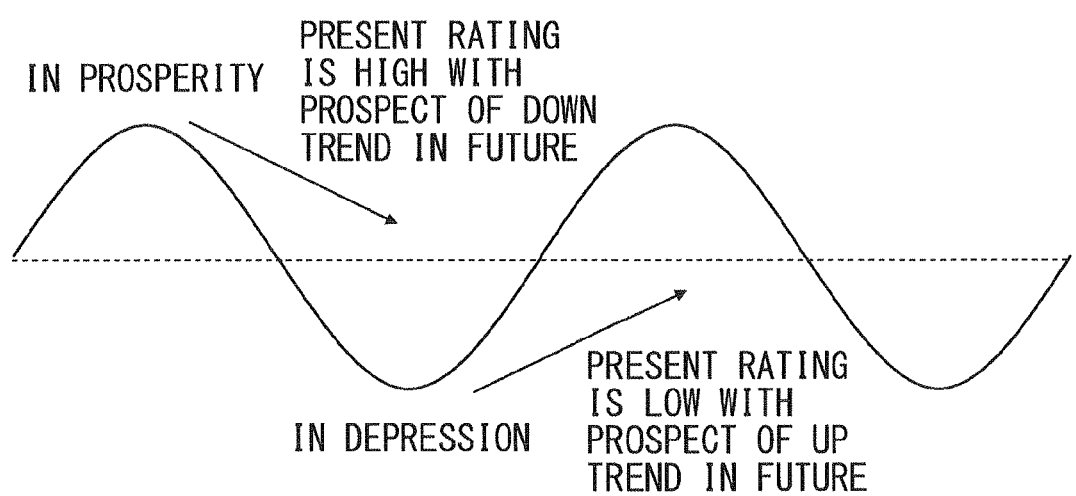
FIG. 1B is a graph illustrating an example of the relationship between the business condition and the rating.

Further, as illustrated in FIG. 1B, the present rating is high but the tendency of downward trend is forecasted as a prospect of the rating transition in a period of prosperity. The opposite applies to the rating in a period of recession.

Hence, in one aspect, the rating after transition is simulated (using a later-described rating transition matrix) using the Monte Carlo method, the Quasi-Monte Carlo method or the like to calculate the risk amount from the rating after transition. Use of this configuration makes it possible to incorporate the property of the above-described mean reversion. Note that this configuration can be used as a stress scenario to assume the rating transition of the downward trend tendency at all times also in a period of depression or used assuming the status quo.

Accordingly, the financial institution, which needs to enhance capital adequacy and so on worth the risk amount, can enhance the capital adequacy and so on for a long term and ensure the stability of the management base in particular by using the risk amount incorporating the rating transition as described above.

Hereinafter, the method of simulating the risk amount based on the rating after transition and finding the credit limit categorized by rating will be explained.

Figure 2:
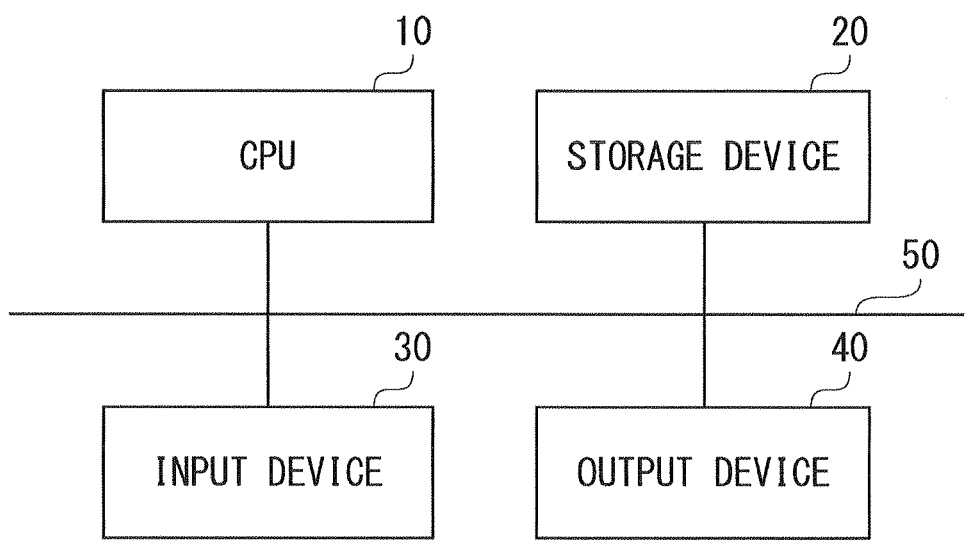
FIG. 2 is a diagram illustrating an example of the hardware configuration of an information processing apparatus.

FIG. 2 is a diagram illustrating an example of the hardware configuration of an information processing apparatus according to this aspect.

The information processing apparatus is configured to include a CPU (Central Processing Unit) 10, a storage device 20, an input device 30, and an output device 40. The CPU 10, the storage device 20, the input device 30, and the output device 40 are connected to be communicable via a bus 50.

The CPU 10 reads a program from the storage device 20 as necessary and executes the program. By executing the program, later-described functions in the information processing apparatus and processing relating to a later-described flowchart are implemented.

The storage device 20 may comprise a ROM (Read Only Memory), a RAM (Random Access Memory), and an HD (Hard Disk), among other storage devices, and stores various kinds of information. The storage device 20 (for example, ROM) stores the program and other code, for example, first read at power-on of the information processing apparatus. Further, the storage device 20 (for example, RAM) functions as a main memory of the information processing apparatus. Further, the storage device 20 (for example, HD) stores numeric data and so on calculated by the CPU 10 in addition to the program.

The input device 30 is a device which may comprise a keyboard and a mouse, among other input devices, operated by a user and inputs various kinds of information into the information processing apparatus. The output device 40 is a device which may comprise a display, among other output devices, used by the user and outputs various kinds of information, a screen and so on.

Note that the information processing apparatus may include an interface which connects itself (namely, the information processing apparatus) to an external storage device (for example, a CD-ROM drive), a network and so on. More specifically, the information processing apparatus may acquire various kinds of information to be stored in the storage device 20 from a recording medium such as a CD-ROM or the like or may download via the network or the like.

Figure 3:
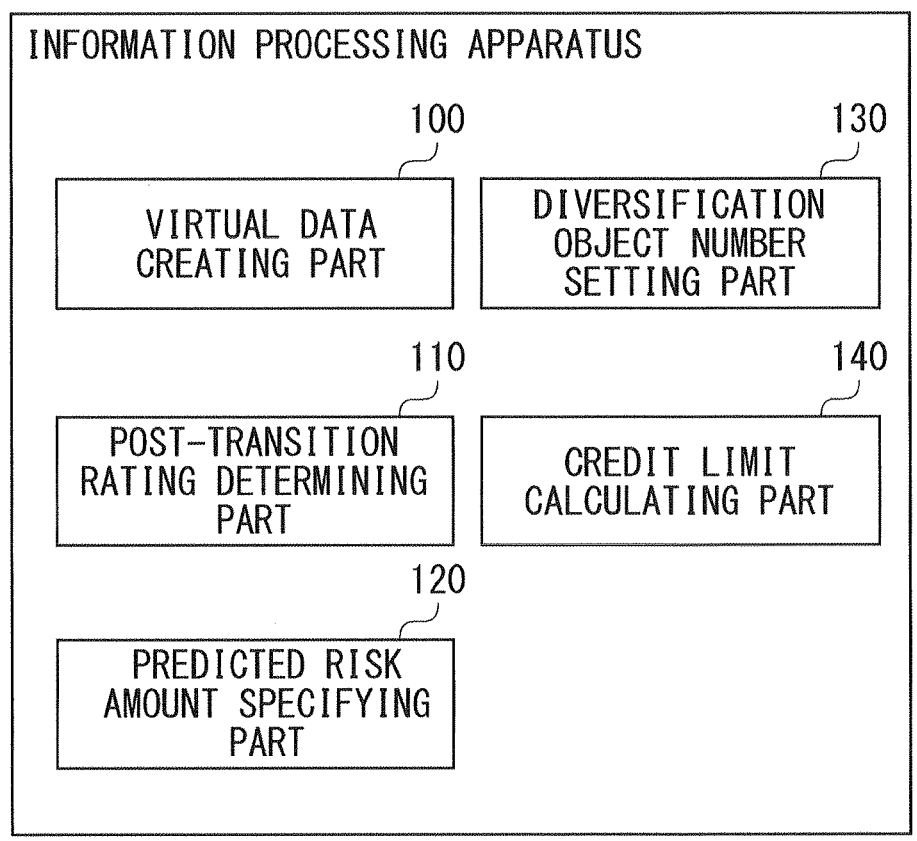
FIG. 3 is a diagram illustrating an example of the functional configuration of the information processing apparatus.

Next, the functional configuration of the information processing apparatus will be explained with reference to FIG. 3. FIG. 3 is a diagram illustrating an example of the functional configuration of the information processing apparatus. The information processing apparatus is configured to include a virtual data creating part 100, a post-transition rating determining part 110, a predicted risk amount specifying part 120, a diversification object number setting part 130, and a credit limit calculating part 140.

The virtual data creating part 100 creates virtual data of the effective obligor number N (for example, later-described virtual portfolio data) based on setting information (for example, later-described various parameters).

The post-transition rating determining part 110 determines ratings after transition of the virtual data (for example, later-described rating transition scenarios) for a plurality of scenarios according to rating transition data (for example, a later-described rating transition matrix) representing the transition of each rating stored in the storage device 20 that is an example of the storage part.

The predicted risk amount specifying part 120 calculates a risk amount for each of the scenarios based on the rating after transition of the virtual data and specifies the predicted risk amount of the virtual data (for example, a risk amount corresponding to a later-described confidence level $100\alpha\%$ point of rating transition).

The diversification object number setting part 130 sets the minimum N among Ns which make the risk amounts to lower than the allowable risk amount stored in the storage part, as a diversification object number (for example, a later-described minimum diversified company number $N_{min}$).

The credit limit calculating part 140 calculates the credit limit based on the diversification object number set by the diversification object number setting part 130 and the total credit stored in the storage part.

Figure 4:
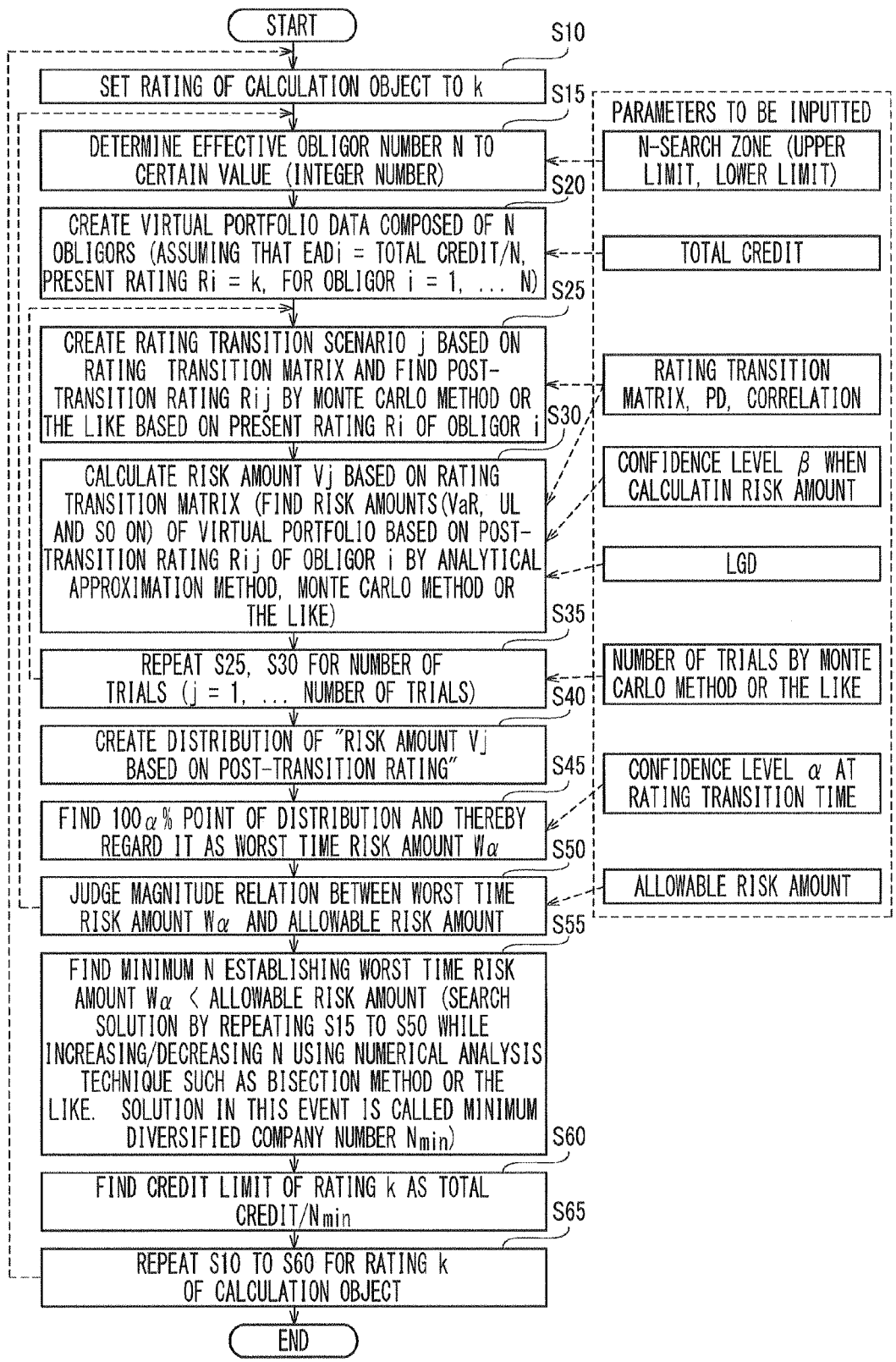
FIG. 4 is a diagram illustrating an example of a flowchart relating to credit limit calculation processing.

FIG. 4 is a diagram illustrating an example of a flowchart relating to credit limit calculation processing in the information processing apparatus.

First, the CPU 10 determines the rating (k) of a calculation object (Step S10). More specifically, the CPU 10 reads a rating of the calculation object from the storage device 20. The ratings of the calculation objects may be individually set as rating-categorized parameters in advance, for example, by the user operation via the screen (see, for example, FIG. 5A)

Then, the CPU 10 determines the effective obligor number (N) (Step S15). More specifically, the CPU 10 reads the upper limit value and the lower limit value of the zone (N-search zone) for searching the effective obligor number from the storage device 20 and determines the value (integer number) of the effective obligor number using, for example, the bisection method. The upper limit value and the lower limit value of the N-search zone are set as various setting parameters in advance, for example, by the user operation via the screen (see, for example FIG. 5B).

The bisection method is explained more concretely as the followings (a) to (c).

(a) The case where the magnitude relationship (+−) between the predicted risk amount when the effective obligor number N is the upper limit value of the N-search zone and the allowable risk amount is equal to the magnitude relationship when N is similarly the lower limit value is regarded as an error.

(b) If the magnitude relationship when N is the medium value (integer number) between the upper limit value and the lower limit value is equal to the lower limit value, the lower limit value is replaced by the medium value, and (b) is carried out again. When the magnitude relationship is equal to the upper limit value, the upper limit value is replaced by the medium value, and (b) is carried out again.

(c) (b) is repeated until the difference between the lower limit value and the upper limit value becomes 1 or less, and the upper limit value at that time is regarded as the minimum diversified company number.

Subsequently, the CPU 10 creates virtual portfolio data on the effective obligor number (Step S20). More specifically, the CPU 10 reads the total credit from the storage device 20 and finds the EAD (=the total credit/the effective obligor number) of each obligor (i=1, . . . N) as the virtual portfolio data. The total credit may be set as a fundamental parameter in advance, for example, by the user operation via the screen (see, for example, FIG. 5C).

Subsequently, the CPU 10 creates the rating transition scenario based on the rating transition matrix and finds the post-transition rating (Step S25). More specifically, the CPU 10 reads a rating transition matrix, a probability of default (PD), and a correlation from the storage device 20 based on the present rating (Ri) of the obligor (i) and finds the post-transition rating (Rij) for the rating transition scenario (j=1, . . . the number of trials) by the Monte Carlo method, the Quasi-Monte Carlo method or the like. Note that the correlation means that the obligors relate to one another (for example, the obligors do not separately default but default by association in a depression).

The rating transition matrix here may be set in advance, for example, by the user operation via the screen (see, for example, FIG. 5D). The rating transition matrix indicates what rating the rating in the present period will be in the next period, namely, how the rating in the present period changes. Note that the ratings include "S" as the highest rating and lower in the order of "A," "B," . . . , and default means going into debt default in this aspect of the present invention.

Further, the PD and the correlation may be set as the rating-categorized parameters for each rating in advance, for example, by the user operation via the screen (see, for example, FIG. 5A).

Subsequently, the CPU 10 calculates the risk amount (VaR, UL and so on) based on the post-transition rating (Step S30). More specifically, the CPU 10 finds the risk amount of the virtual portfolio data based on the post-transition rating of the obligor by the analytical approximation method, the Monte Carlo method or the like.

Subsequently, the CPU 10 performs processing at Step S25 and Step S30 for the number of trials (Step S35). In other words, the CPU 10 judges whether the processing for the number of trials has been carried out. In this event, the CPU 10 performs the processing at Step S40 when it judges that processing for the number of trials has been carried out, whereas the CPU 10 performs the processing at Step S25 when it judges that processing for the number of trials has not been carried out.

At Step S40, the CPU 10 creates the distribution of the risk amount based on the post-transition rating.

Then, the CPU 10 finds the 100α% point (incidentally, α is the value of the confidence level at the rating transition illustrated in FIG. 5C) of the created distribution and thereby regards it as a worst time risk amount ($W_\alpha$) occurring with a probability of α (Step S45).

Subsequently, the CPU 10 judges the magnitude relationship between the worst time risk amount and the allowable risk amount (in other words, the zone including a solution) (Step S50).

Subsequently, the CPU 10 finds the minimum effective obligor number (minimum diversified company number $N_{min}$) establishing the worst time risk amount<the allowable risk amount (Step S55). In other words, the CPU 10 judges whether the solution could have been found or not. In this event, the CPU 10 performs the processing at Step S60 when it judges that the minimum effective obligor number has been found, whereas the CPU 10 performs the processing at Step S15 when it judges that the minimum effective obligor number has not been found.

At Step S60, the CPU 10 finds the credit limit of the rating of the calculation object by calculating the total credit/the minimum effective obligor number. Note that the CPU 10 may treat the fraction of the calculation result by rounding off at an arbitrary digit.

Subsequently, the CPU 10 judges whether all of credit limits of ratings of calculation object have been found (Step S65). In this event, the CPU 10 ends the credit limit calculation processing when it judges that all of the credit limits have been found, whereas the CPU 10 performs the processing at Step S10 when it judges that there is a rating of the calculation object for which the credit limit has not been found.

Note that after ending the above-described credit limit calculation processing, the CPU 10 may display the credit limit for each rating on the output device as the calculation result (see, for example, FIG. 5E).

The calculation method of the credit limit will be explained here taking a more concrete example, in accordance with one aspect of the present invention. Note that the various parameters here are the same as those illustrated in FIG. 5.

Further, as described above, the CPU 10 sequentially reads the ratings illustrated in FIG. 5A and repeatedly performs the processing at Step S10 to Step S65 for each rating in one aspect. Here, the case where the rating read by the CPU 10 from the storage device 20 is "C" (hereinafter, referred to as a C-rating) will be explained.

Further, as described above, the CPU 10 repeatedly performs S15 to S55 while changing N until N satisfying predetermined conditions by the bisection method in this aspect. The example illustrated in FIG. 5B indicates the minimum value of N is 10 and the maximum value of N is 1000, and a case where the effective obligor number is determined as 100 at Step S15 will be explained here.

Note that though N is changed by the bisection method in this aspect, the calculation method may be configured, but not limited, to find N satisfying predetermined conditions while incrementing the value of N in order from the minimum value by one (namely, the minimum value N satisfying the worst time risk amount $W_\alpha$<the allowable risk amount).

First, the CPU 10 creates the virtual portfolio data (Step S20). The virtual portfolio data is configured to include, as illustrated in FIG. 6, the present rating (present rating Ri) and the EAD (EADi) for the obligor (obligor i). The EAD is calculated by subtracting the total credit by the effective obligor number (N), and the EAD is 1500 (billion yen)/100

(obligors)=15 (billion yen) in this example. Additionally, N is 100, N−1 is 99, and N−2 is 98 in this example.

Subsequently, the CPU 10 acquires the values (0%, 0%, 4.0%, 70.0%, 16.0%, 5.0%, 3.0%, 1.9%, 0.1%) in a row corresponding to the C-rating in the rating transition matrix, and finds the post-transition rating corresponding to the obligor i (i=1, . . . 100) and the rating transition scenario j (j=1, . . . the number of trials) adopting the Monte Carlo method (Step S25).

Explaining in more detail, the CPU 10 finds the post-transition rating by performing the processing procedures (1) to (3). Note that s, r are integer references (integers from 1 are used in order from a lower rating) corresponding to rating symbols in the calculation expressions in the processing procedures 1 to 2. In the example illustrated in FIG. 5D, default, G, F, E, D, C, B, A, S of the rating symbols correspond in order to the integer references 1, 2, 3, 4, 5, 6, 7, 8, 9 respectively. Further, Ri is the present rating of the obligor i and Rij is the post-transition rating in the rating transition scenario j of the obligor i, and one of the rating symbol and the integer reference corresponding to the rating symbol is used to indicate the concrete rating in the specification and the drawings.

Figure 7:
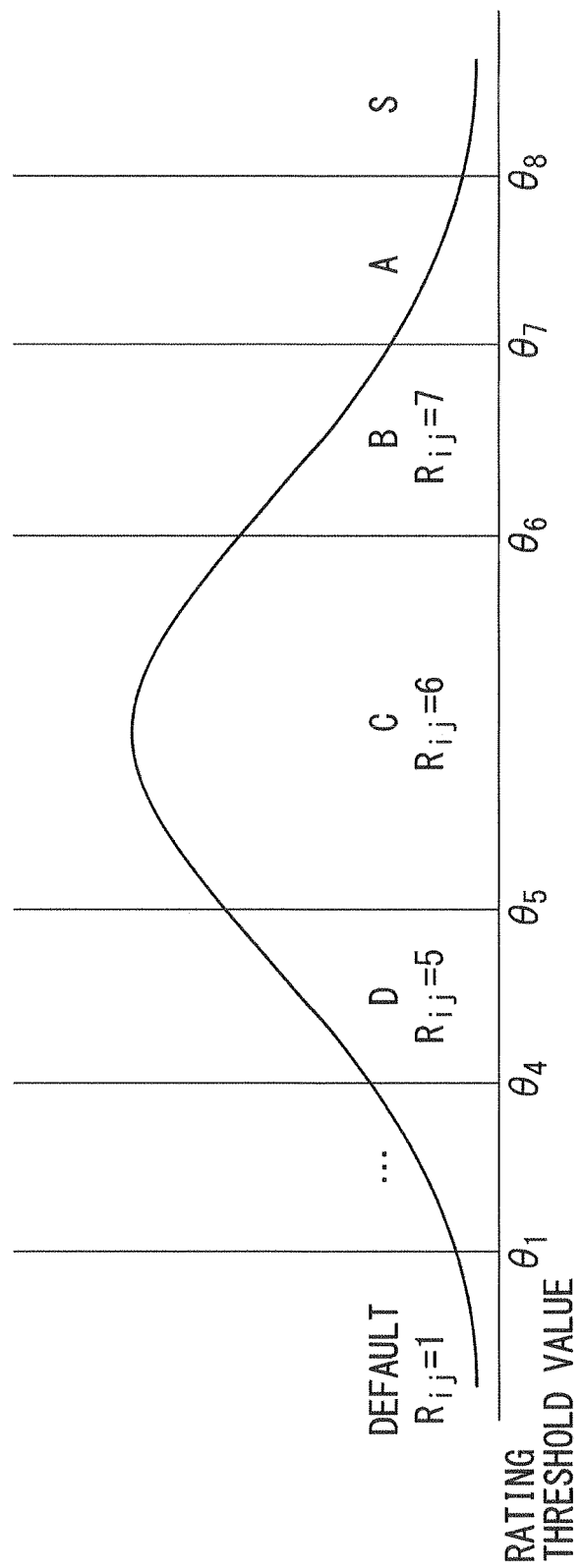
FIG. 7 is a graph illustrating an example of the relationship between the rating threshold value and the probability distribution of enterprise value of an obligor.

Hereinafter, the processing procedures (1) to (3) of calculating the post-transition rating will be explained using FIG. 7 and FIG. 8. FIG. 7 is a graph illustrating an example of the relationship between the rating threshold value and the probability distribution of the enterprise value of an obligor (a probability density function n(x) of a standard normal distribution). FIG. 8 is a chart illustrating a plurality of rating transition scenarios, illustrating an example of the post-transition rating in each of rating transition scenarios found by the CPU 10. Further, a case where the number of trials by the Monte Carlo method is 10000 will be explained here as an example.

Processing Procedure (1)

First, the CPU 10 reads the values in the row corresponding to the rating (C-rating, here) of the calculation object read at Step S10 in the rating transition matrix illustrated in FIG. 5D stored in the storage device 20, and calculates a rating threshold value $\theta_r$ indicated on the horizontal axis in FIG. 7 using Expression (1) and Expression (2). The rating threshold value $\theta_r$ is the threshold value of the enterprise value at transition of the rating from a rating s to a rating r or lower. FIG. 7 is a chart illustrating an example of the relationship between the rating threshold value and the probability distribution of the enterprise value of an obligor (a probability density function n(x) of a standard normal distribution), in which the horizontal axis indicates the enterprise value and the vertical axis indicates the probability of achieving each enterprise value. Note that the curve representing the distribution of the enterprise value illustrated in FIG. 7 is schematically indicated for explaining the rating threshold values $\theta_0$ to $\theta_9$ but not individually calculated for each obligor.

$$ps_{sr} = \sum_{k=1}^{r} p_{sk} \tag{1}$$

$$\theta_r = N^{-1}(ps_{sr}) \tag{2}$$

Here, $P_{sk}$ is a probability of transition of the rating from the current rating (Ri=s) to the rating corresponding to k. In this example, $P_{sk}$ is the acquired value in the row corresponding to the C-rating in the rating transition matrix. More specifically, the present C-rating corresponds to the integer reference 6 in this example, and each of values of $P_{6k}$ (k=1 to 9) are set. In short, the probability of transition from the present C-rating to default, G-rating, F-rating, E-rating, D-rating, C-rating, B-rating, A-rating, S-rating are expressed respectively as $P_{61}$, $P_{62}$, $P_{63}$, $P_{64}$, $P_{65}$, $P_{66}$, $P_{67}$, $P_{68}$, $P_{69}$ respectively into which the values in the row corresponding to the C-rating in the rating transition matrix in FIG. 5D, namely, 0.1%, 1.9%, 3.0%, 5.0%, 16.0%, 70.0%, 4.0%, 0%, 0% will be substituted respectively.

Further, $PS_{sr}$ is a probability of transition from the present rating (Ri=s) to the rating corresponding to r or lower. For example, the probability of transition from the present C-rating to the rating corresponding to r (=1 to 9) or lower is expressed as $PS_{6r}$. More specifically, the probability of transition from the present C-rating to the D-rating or lower is expressed as $PS_{6r}=P_{61}+P_{62}+P_{63}+P_{64}+P_{65}$ because the D-rating corresponds to the integer reference 5.

Further, N(x) is a cumulative probability function of the standard normal distribution, and $N^{-1}(x)$ is an inverse function of N(x). Though the aforementioned $\theta_0$ and $\theta_9$ are not illustrated, $\theta_0 = -\infty$ and $\theta_9 = \infty$. For example, assuming that the present rating is the C-rating, $PS_{60} = 60\%$ and $PS_{69} = 100\%$ are substituted into Expression (2), whereby $\theta_0$ and $\theta_9$ are found respectively.

Processing Procedure (2)

Subsequently, the CPU 10 creates a random number representing the enterprise value ($x_i$) of the obligor (obligor i). The standard normally distributed random number is created using, for example, Mersenne Twister and may be created using, but not particularly limited to, other random number creation methods. The CPU 10 then sets the post-transition rating Rij to r when the created random number satisfies Expression (3).

More specifically, the CPU 10 compares the created random number to each value of the rating threshold values $\theta_0$ to $\theta_9$ indicated on the horizontal axis in FIG. 7 and specifies r (=1 to 9) satisfying Expression (3). Then, the CPU 10 determines the rating corresponding to the specified r as the post-transition rating Rij illustrated in FIG. 8 and stores it in the storage device 20. For example, in the case where the present rating is the C-rating for the obligor 1, when the random number $x_i$ created in the rating transition scenario 1 is a value satisfying $\theta_4 < x_i < \theta_5$, the CPU 10 judges that the post-transition rating is the D-rating and stores it in the storage device 20.

$$\theta_{r-1} \leq x_i < \theta_r \tag{3}$$

Processing Procedure (3)

The CPU 10 repeatedly performs the processing procedure (2) for all of the obligors and the rating transition scenarios. In short, the processing procedure (2) is performed 100 (obligors)×10000 (times)=1000000 (times) in this example.

More specifically, the CPU 10 first creates random numbers ($x_1$ to $x_{100}$) in the rating transition scenario 1 for all of the obligors i (i=1 to 100) illustrated in FIG. 8, and specifies r satisfying Expression (3) as in the processing procedure (2) for all of $x_i$s (i=1 to 100). Thus, the CPU 10 determines the post-transition rating $R_{i1}$ (a column of the rating transition scenario j=1 in FIG. 8) of each obligor i (i=1 to 100) in the rating transition scenario 1. Then, the CPU 10 similarly determines the post-transition rating $R_{i2}$ of each obligors i (i=1 to 100) in the rating transition scenario 2. Further, the CPU 10 repeats the same processing until the rating transition scenario 10000.

Then, the CPU 10 calculates the risk amount based on the found post-transition rating by the analytical approximation method, the Monte Carlo method or the like for each of the rating transition scenarios j (j=1 to 10000) (Step S30). Documents disclosing the method of calculating the risk amount using the analytical approximation method, the Monte Carlo method or the like include, for example: Ando Yoshitaka, "An Analytical Evaluation Method for Credit Risk of Credit Portfolio Centered on Limiting Loss Distribution and Granularity Adjustment," *Monetary and Economic Studies,* 2005. 7, Institute of Monetary and Economic Studies, Bank of Japan (alternatively referred to herein as Reference Document 2); Kikuchi Kentaro, "An Analytic Method for Evaluating Credit Portfolio VaR: Theory and Numerical Verification of Approximate Calculation by the Conditioned Saddle Point Method," *Monetary and Economic Studies*, vol. 26, separate volume 2, Institute of Monetary and Economic Studies, Bank of Japan, 2007 (alternatively referred to herein as Reference Document 3); and Higo Hideaki, "Basic and Application of Credit Risk Measuring Model," Center for Advanced Finance Bureau, Banking and Financial Mechanism, Bank of Japan, Jul. 10, 2006 (alternatively referred to herein as Reference Document 4). The entirety of each of Reference Documents 2, 3 and 4 is incorporated by reference herein.

Hereinafter, the method of calculating the risk amount using Expression (24) to Expression (30) discussed in the reference document 2 will be explained.

First, the CPU 10 creates, as illustrated in FIG. 9, parameters used for calculating the risk amount (risk amount calculating parameters) for each rating transition scenario created at Step S25. The risk amount calculating parameters are configured to include the rating transition scenario, PD, correlation, LGD (Loss Given Default), and EAD for each obligor.

In other words, the CPU 10 acquires the PD, correlation, LGD (Loss Given Default), and EAD corresponding to the post-transition rating of each obligor i (i=1 to 100) for all of the rating transition scenarios j (j=1 to 10000) from the rating-categorized parameters illustrated in FIG. 5A and the fundamental parameters illustrated in FIG. 5C, and stores data in the configuration as illustrated in FIG. 9 into the storage device 20 to thereby prepare the data as the risk amount calculating parameters. FIG. 9 is a chart illustrating the risk amount calculating parameters for the rating transition scenario 1.

More specifically, the PD (PDi) illustrated in FIG. 9 is the value corresponding to the post-transition rating of the PD of the rating-categorized parameters illustrated in FIG. 5A. For example, since the post-transition rating of the obligor 1 is the D-rating in the rating transition scenario 1, 0.50% corresponding to the D-rating is acquired by the CPU 10 from the rating-categorized parameters stored in the storage device 20 as illustrated in FIG. 9.

Further, the correlation (correlation ri) illustrated in FIG. 9 is the value corresponding to the post-transition rating of the correlation of the rating-categorized parameters illustrated in FIG. 5A. For example, the post-transition rating of the obligor 1 in the rating transition scenario 1 is the D-rating as illustrated in FIG. 9, and 2.00% corresponding to the D-rating is acquired by the CPU 10 from the rating-categorized parameters stored in the storage device 20.

Further, the LGD (LGDi) illustrated in FIG. 9 is the LGD of the fundamental parameters illustrated in FIG. 5C and is 45% in this example which is acquired by the CPU 10 from the rating-categorized parameters stored in the storage device 20.

Further, the EAD (EADi) illustrated in FIG. 9 is the EAD of each obligor in the virtual portfolio data illustrated in FIG. 6 and is 15 billion in this example. The EAD (EADi) of each obligor is acquired by the CPU 10 from the storage device 20 storing the virtual portfolio data created at Step S20.

Subsequently, the CPU 10 finds the risk amount (UL or VaR) as illustrated in FIG. 10 for each rating transition scenario from Expressions (4) to (15) and the created risk amount calculating parameters. More specifically, the CPU 10 will substitute $x=N^{-1}(1-\beta)$ into Expression (14) when calculating the VaR. In this event, the CPU 10 will first calculate the values shown in Expression (4) to Expression (12) using $x=N^{-1}(1-\beta)$ and the above-described risk amount calculating parameters, and then calculate the VaR using Expression (14). For calculating the UL, since the EL is required as illustrated in Expression (15) in addition to the VaR calculated using Expression (14), the CPU 10 will calculate the EL using Expression (13) using the above-described risk amount calculating parameters and then calculate the UL shown in Expression (15). Note that $\beta$ is the confidence level when calculating the risk amount and is 99.0% in this example (see, for example, FIG. 5C). Further, the UL is indicated as an example of the risk amount Vj of the scenario j in FIG. 10.

$$p_i(x) = N\left(\frac{N^{-1}(PD_i) - \sqrt{r_i}\,x}{\sqrt{1-r_i}}\right) \tag{4}$$

$$p'_i(x) = \sqrt{\frac{r_i}{1-r_i}} \cdot n\left(\frac{N^{-1}(PD_i) - \sqrt{r_i}\,x}{\sqrt{1-r_i}}\right) \tag{5}$$

$$p''_i(x) = -\frac{r_i}{1-r_i} \cdot \frac{N^{-1}(PD_i) - \sqrt{r_i}\,x}{\sqrt{1-r_i}} \cdot n\left(\frac{N^{-1}(PD_i) - \sqrt{r_i}\,x}{\sqrt{1-r_i}}\right) \tag{6}$$

$$l(x) = \sum_{i=1}^{N} EAD_i LGD_i p_i(x) \tag{7}$$

$$l'(x) = \sum_{i=1}^{N} EAD_i LGD_i p'_i(x) \tag{8}$$

$$l''(x) = \sum_{i=1}^{N} EAD_i LGD_i p''_i(x) \tag{9}$$

$$v(x) = \sum_{i=1}^{N} EAD_i^2 LGD_i^2 p_i(x)(1 - p_i(x)) \tag{10}$$

$$v'(x) = \sum_{i=1}^{N} EAD_i^2 LGD_i^2 p'_i(x)(1 - 2p_i(x)) \tag{11}$$

$$\Delta q = -\frac{1}{2l'(x)}\left(v'(x) - v(x)\left(\frac{l''(x)}{l'(x)} + x\right)\right)\bigg|_{x=N^{-1}(1-\beta)} \tag{12}$$

$$EL = \sum_{i=1}^{N} EAD_i LGD_i PD_i \tag{13}$$

$$VaR = l(x)|_{x=N^{-1}(1-\beta)} + \Delta q \tag{14}$$

$$UL = VaR - EL \tag{15}$$

Here, $p_i(x)$: is a conditional probability of default (condition is $x=N^{-1}(1-\beta)$)

$p_i'(x)$: is a first derivative of a conditional probability of default $p_i''(x)$: is a second derivative of a conditional probability of default $l(x)$: is a conditional expected value of a default loss $l'(x)$: is a first derivative of a conditional expected value of a default loss $l''(x)$: is a second derivative of a conditional expected value of a default loss v(x): is a conditional variance of a default loss v'(x): is a first derivative of a conditional variance of a default loss Δq: is a granularity adjustment term EL: is an expected loss VaR: is a value at risk UL: is an unexpected loss FIG. 10 illustrates an example of the calculation result for each rating transition scenario (risk amount Vj). Subsequently, the CPU 10 creates the probability distribution of the risk amount and determines the risk amount corresponding to a 99% point set as the confidence level (α) at the rating transition time as the worst time risk amount ($W_\alpha$). In other words, the CPU 10 determines, for example, a (the number of trials×the confidence level at the rating transition time)-th risk amount when the risk amounts illustrated in FIG. 10 are arranged in the ascending order as the worst time risk amount. For example, when the number of trials is 10000 and the confidence level at the rating transition time is 99%, the 9900 (=10000×0.99)-th risk amount counted from the smallest risk amount is determined as the worst time risk amount in the effective obligor number N that is the calculation object. The CPU 10 then judges the magnitude relationship between the worst time risk amount and the allowable risk amount and stores the judgment result in the storage device 20. Note that as the risk amount, the UL may be adopted or the VaR may be adopted.

Subsequently, the CPU 10 changes the effective obligor number N as necessary and determines the worst time risk amount similarly to the above. Thus, data of the worst time risk amount is created for each effective obligor number N as illustrated in FIG. 11. The CPU 10 then judges the magnitude relationship between the worst time risk amount for each effective obligor number N and the allowable risk amount, and determines the minimum effective obligor number to make the worst time risk amount smaller than the allowable risk amount, namely, the minimum diversified company number $N_{min}$, and finds the credit limit (=the total credit/the minimum effective obligor number). Note that though the image of calculation result for the worst time risk amount when N is incremented by one is illustrated for explanation in the example illustrated in FIG. 11, N is not always incremented by one in the case using the bisection method.

As described above, the CPU 10 repeats a series of processing of calculating the worst time risk amount at Step S20 to Step S45 for each effective obligor number N determined by the bisection method at Step S15 and judging the magnitude relationship between the worst time risk amount and the allowable risk amount at Step S50, finally determines the minimum effective obligor number N among the effective obligor numbers N when the worst time risk amounts smaller than the allowable risk amount are specified, as the minimum diversified company number $N_{min}$ at Step S55, and calculates the credit limit at Step S60. Note that since the worst time risk amount is maximum when the effective obligor number N is minimum, it is also possible to determine the minimum effective obligor number N when the maximum worst time risk amount among the worst time risk amounts smaller than the allowable risk amount is specified as the minimum diversified company number $N_{min}$. The series of processing from Step S15 to Step S60 of determining the minimum diversified company number $N_{min}$ will be repeated for each rating selected at Step S10 to finally create data of the credit limit for each rating as illustrated in FIG. 5E.

According to one aspect, the credit limit may be calculated based on the value of the risk indicator in consideration of the probabilistic maximum loss such as not only the expected loss but also the VaR and UL. In addition, the credit limit may be calculated using the value of the risk indicator calculated based on the post-transition rating, thus making it possible to incorporate the property of the mean reversion in the credit limit to solve the pro-cyclicality. Accordingly, it becomes possible to set an appropriate credit limit that is not affected only by the present business condition.

Therefore, the financial institution which needs to enhance capital adequacy and so on worth the risk amount can enhance the capital adequacy and so on for a long term and ensure the stability of the management base in particular by using the risk amount incorporating transition of the rating.

Though the method of finding the minimum diversified company number $N_{min}$ has been described using the bisection method in this aspect, other search algorithms may be used. For example, the minimum diversified company number $N_{min}$ may be found by calculating the object in the search zone one by one.

Figure 12:
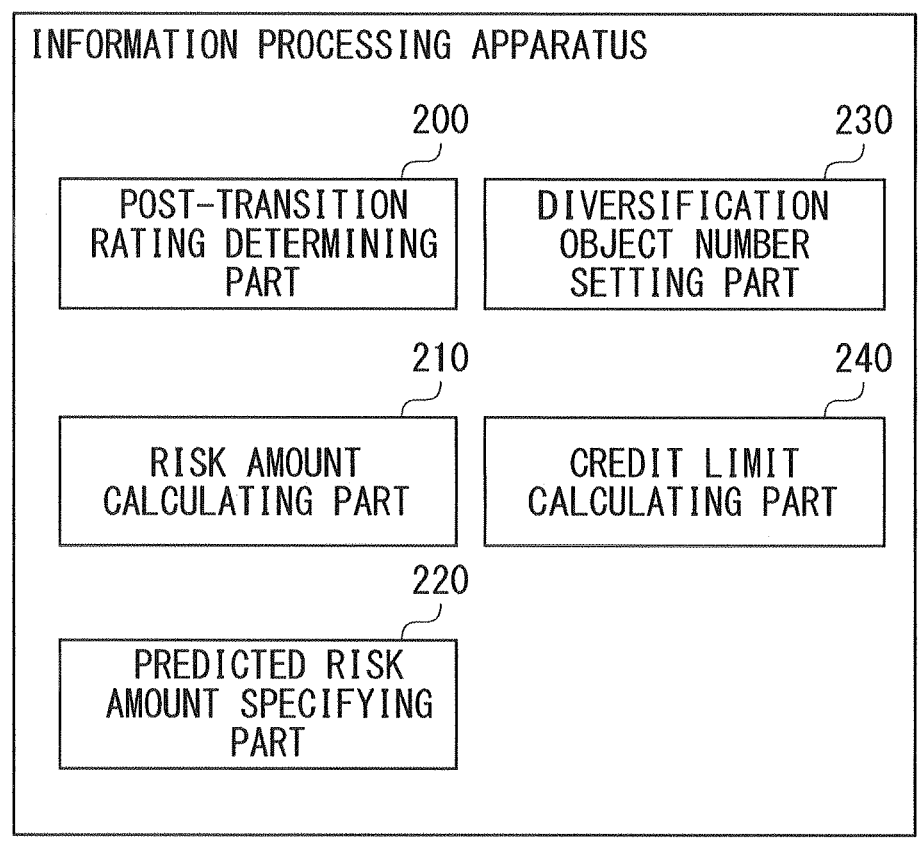
FIG. 12 is a diagram illustrating an example of the functional configuration of the information processing apparatus.

Further, the information processing apparatus has, but not limited to, the functional configuration illustrated in FIG. 3 in this aspect. For example, the information processing apparatus may have the functional configuration illustrated in FIG. 12. This information processing apparatus is configured to include a post-transition rating determining part 200, a risk amount calculating part 210, a predicted risk amount specifying part 220, a diversification object number setting part 230, and a credit limit calculating part 240.

The post-transition rating determining part 200 acquires rating transition data from the storage part and determines ratings after transition in a plurality of scenarios (for example, rating transition scenarios) composed of an object number N (for example, an effective obligor number N), using random numbers. The risk amount calculating part 210 calculates the risk amount for each scenario based on the correlation and the probability of default corresponding to the rating after transition determined in the post-transition rating determining part 200, the loss given default, and the total credit The predicted risk amount specifying part 220 specifies the predicted risk amount from the risk amount calculated in the risk amount calculating part 210. The diversification object number setting part 230 sets the minimum N among Ns to make the risk amounts smaller than the allowable risk amount stored in the storage part as the diversification object number. The credit limit calculating part 240 calculates the credit limit based on the diversification object number set in the diversification object number setting part 230 and the total credit stored in the storage part.

Further, the calculation using the Monte Carlo method, the Quasi-Monte Carlo method, the analytical approximation method or the like is performed by repeating the same calculation pattern for each obligor. Hence, the post-transition rating determining part 110, the predicted risk amount specifying part 120, the post-transition rating determining part 200, the risk amount calculating part 210 and so on use the function called SIMD (Single Instruction Multiple Data) (SIMD function) incorporated in the CPU 10 (provided by the CPU 10) to increase the speed of the calculation.

Further, for the PD, the failing concerned target default standard and the management required target default standard can be adopted, and the values with stress may be adopted. This also applies to the correlation and LGD.

Further, for the rating transition matrix, the values with stress may be used, other than the value found from the past actual result. Other than the transition probability in one year, the transition probability in several year or less than one year may also be adopted.

For the total credit, a total credit including the amount preserved by the collateral, the guarantee or the like of the loan balance, the accrued interest, the un-withdrawn portion of the commitment line or the like may be adopted or a total credit not including them may be adopted. Note that other than the actual balance at a reference time, planned figures may be used.

Further, for the total credit and the allowable risk amount, different values for each rating may be adopted.

Further, for the credit limit found in the above-described manner, for example, convenient figures may be adopted or a credit limit multiplied by a certain loan-to-value ratio may be adopted as an alarm line on the practical business condition.

According to the above-described aspect, the credit limit can be set more appropriately.

Further, the credit limit is found by the one-dimensional numerical analysis using N as a variable using the virtual portfolio of only the obligors with the same kind of risk characteristic (homogeneous) in the above-described aspect. On the other hand, there is a room to search for the numerical technique such as creating the virtual portfolio constituted of obligors with a wide variety of risk characteristics using multidimensional variables. However, the calculation of the credit limit is not related only to the discussion of the numerical technique but should be discussed together with the business condition meaning and the corresponding contents when the credit limit and the allowable risk amount are exceeded. Hence, the configuration to make a one-dimensional monotone function whose explanation and result prediction are easy is adopted for convenience in the above-described aspect.

Although preferred aspects of the present invention have been described above, the present invention is not limited to the particular aspects described, but various changes and modifications may be made within the scope of the present invention as set forth in claims.

According to one aspect, the credit limit can be set more appropriately.

The described aspects of the present invention are to be considered in all respects as illustrative and not restrictive, and all changes which come within the meaning and range of equivalency of the claims are therefore intended to be embraced therein. The invention may be embodied in other specific forms without departing from the spirit or essential characteristics thereof.

What is claimed is:

1. An information processing apparatus comprising a processor and a memory, wherein the memory has stored therein a virtual data creating unit, a post-transition rating determining unit, a predicted risk amount specifying unit, a diversification object number setting unit, and a credit limit calculating unit, and wherein the processor is configured to access and execute the units in the memory, comprising:

the virtual data creating unit creating, via the processor, virtual data of an effective obligor number N based on setting information stored in the memory storage part;

the post-transition rating determining unit determining, via the processor, ratings after transition of the virtual data for a plurality of scenarios according to rating transition data representing transition of each rating stored in the memory storage part;

the predicted risk amount specifying unit calculating, via the processor, a risk amount for each of the scenarios based on the rating after transition of the virtual data and specifying a risk amount corresponding to a confidence level stored in the memory storage part as a predicted risk amount of the virtual data;

the diversification object number setting unit setting, via the processor, a minimum effective obligor number N among the effective obligor numbers N when predicted risk amounts smaller than an allowable risk amount stored in the memory storage part are specified by said predicted risk amount specifying unit, as a diversification object number; and the credit limit calculating unit calculating, via the processor, a credit limit based on the diversification object number set by said diversification object number setting unit and a total credit stored in the memory storage part.

2. The information processing apparatus according to claim 1, wherein said post-transition rating determining unit determines the rating after transition by adopting the Monte Carlo method or the Quasi-Monte Carlo method, and wherein said predicted risk amount specifying unit calculates the risk amount by adopting any one of the Monte Carlo method, the Quasi-Monte Carlo method, and the analytical approximation method.

3. The information processing apparatus according to claim 1, wherein said post-transition rating determining unit determines the rating after transition using an SIMD function provided by a CPU, and wherein said predicted risk amount specifying unit calculates the risk amount using the SIMD function provided by the CPU.

4. An information processing method executed by an information processing apparatus, the information processing method comprising:

a virtual data creating step of creating, by the information processing apparatus, virtual data of an effective obligor number N based on setting information stored in a storage part;

a post-transition rating determining step of determining, by the information processing apparatus, ratings after transition of the virtual data for a plurality of scenarios according to rating transition data representing transition of each rating stored in the storage part;

a predicted risk amount specifying step of calculating, by the information processing apparatus, a risk amount for each of the scenarios based on the rating after transition of the virtual data and specifying a risk amount corresponding to a confidence level stored in the storage part as a predicted risk amount of the virtual data;

a diversification object number setting step of setting, by the information processing apparatus, a minimum effective obligor number N among the effective obligor numbers N when predicted risk amounts smaller than an allowable risk amount stored in the storage part are specified in said predicted risk amount specifying step, as a diversification object number; and a credit limit calculating step of calculating, by the information processing apparatus, a credit limit based on the diversification object number set in said diversification object number setting step and a total credit stored in the storage part.

5. A computer program product comprising a non-transitory computer readable medium having control logic stored therein for causing a computer to function as perform processing, the control logic comprising:

at least one instruction for causing the computer to create a virtual data creating unit creating virtual data of an effective obligor number N based on setting information stored in a storage part;

at least one instruction for causing the computer to determine a post-transition rating determining unit determining ratings after transition of the virtual data for a plurality of scenarios according to rating transition data representing transition of each rating stored in the storage part;

at least one instruction for causing the computer to calculate a predicted risk amount specifying unit calculating a risk amount for each of the scenarios based on the rating after transition of the virtual data and specifying a risk amount corresponding to a confidence level stored in the storage part as a predicted risk amount of the virtual data;

at least one instruction for causing the computer to set a diversification object number setting unit setting a minimum effective obligor number N among the effective obligor numbers N when predicted risk amounts smaller than an allowable risk amount stored in the storage part are specified by said predicted risk amount specifying unit, as a diversification object number; and at least one instruction for causing the computer to calculate a credit limit calculating unit calculating a credit limit based on the diversification object number set by said diversification object number setting unit and a total credit stored in the storage part.

\* \* \* \* \*